US011468581B2

(12) United States Patent
Tong et al.

(10) Patent No.: US 11,468,581 B2
(45) Date of Patent: Oct. 11, 2022

(54) DISTANCE MEASUREMENT METHOD, INTELLIGENT CONTROL METHOD, ELECTRONIC DEVICE, AND STORAGE MEDIUM

(71) Applicant: Shenzhen Sensetime Technology Co., Ltd., Shenzhen (CN)

(72) Inventors: Yuanyang Tong, Shenzhen (CN); Ningyuan Mao, Shenzhen (CN); Wenzhi Liu, Shenzhen (CN)

(73) Assignee: Shenzhen Sensetime Technology Co., Ltd., Shenzhen (CN)

( * ) Notice: Subject to any disclaimer, the term of this patent is extended or adjusted under 35 U.S.C. 154(b) by 188 days.

(21) Appl. No.: 16/913,826

(22) Filed: Jun. 26, 2020

(65) Prior Publication Data

US 2020/0326179 A1 Oct. 15, 2020

Related U.S. Application Data

(63) Continuation of application No. PCT/CN2019/084519, filed on Apr. 26, 2019.

(30) Foreign Application Priority Data

Apr. 27, 2018 (CN) .......................... 201810394688.4

(51) Int. Cl.
*G06V 20/58* (2022.01)
*G06T 7/50* (2017.01)
(Continued)

(52) U.S. Cl.
CPC ................ *G06T 7/50* (2017.01); *G01B 11/14* (2013.01); *G01S 11/12* (2013.01); *G06V 20/58* (2022.01);
(Continued)

(58) Field of Classification Search
CPC ....... G06T 7/50; G06T 7/536; G06T 2210/12; G01B 11/14; G01S 11/12; G06V 20/58
See application file for complete search history.

(56) References Cited

U.S. PATENT DOCUMENTS

2007/0291992 A1   12/2007   Shima et al.
2010/0289646 A1*  11/2010   Raniere .................. G08B 21/24
                                                    340/568.1
(Continued)

FOREIGN PATENT DOCUMENTS

CN   103164860   6/2013
CN   103578109   2/2014
(Continued)

OTHER PUBLICATIONS

Wu, et al., "Design and Research for the Intelligence Auto Anti-collision System", Machinery & Electronics, Sep. 24, 2008, 5 pgs, cited in ISR-WO of PCT/CN.
(Continued)

*Primary Examiner* — Sam Bhattacharya
(74) *Attorney, Agent, or Firm* — Henry Patent Law Firm PLLC

(57) ABSTRACT

The present disclosure relates to a distance measurement method, an intelligent control method and apparatus, an electronic device, and a storage medium. The method includes: obtaining a detection bounding box of a target object in an image photographed by a current object; determining at least one distance measurement point according to the shape of the detection bounding box; and determining a distance between the target object and the current object based on the distance measurement point.

18 Claims, 5 Drawing Sheets

(51) Int. Cl.
*G01B 11/14* (2006.01)
*G01S 11/12* (2006.01)

(52) U.S. Cl.
CPC .................. *G06T 2207/30252* (2013.01); *G06T 2210/12* (2013.01)

(56) References Cited

U.S. PATENT DOCUMENTS

| | | | |
|---|---|---|---|
| 2014/0369555 A1* | 12/2014 | Zhong | G06V 10/25 382/103 |
| 2016/0267325 A1* | 9/2016 | Sundaresan | G06V 10/40 |
| 2017/0169313 A1* | 6/2017 | Choi | G06K 9/6267 |
| 2017/0243482 A1* | 8/2017 | Sogabe | G01C 21/3492 |
| 2018/0173971 A1* | 6/2018 | Jia | G06N 3/084 |
| 2018/0203467 A1* | 7/2018 | Zhou | G06V 20/17 |
| 2018/0362185 A1* | 12/2018 | Qian | B64C 39/024 |
| 2019/0130582 A1* | 5/2019 | Cheng | G06V 20/52 |
| 2019/0243138 A1* | 8/2019 | Peltola | G06T 17/10 |
| 2019/0301886 A1* | 10/2019 | Elangovan | G06T 19/006 |
| 2021/0092325 A1* | 3/2021 | Xu | H04N 7/188 |

FOREIGN PATENT DOCUMENTS

| | | |
|---|---|---|
| CN | 104954734 | 9/2015 |
| CN | 106407894 | 2/2017 |
| CN | 107016357 | 8/2017 |
| CN | 107741231 | 2/2018 |
| CN | 108596116 | 9/2018 |
| JP | 2008250686 | 10/2008 |
| JP | 2015132879 | 7/2015 |
| JP | 2016099734 | 5/2016 |
| KR | 101234046 | 2/2013 |

OTHER PUBLICATIONS

WIPO, International Search Report and Written Opinion dated Jul. 26, 2019.
WIPO, International Search Report dated Jul. 26, 2019, in PCT/CN2019/084519, 4 pgs.
CNIPA, First Office Action dated Jan. 6, 2020, in CN 201810394688.4, 15 pgs.
CNIPA, Second Office Action dated Oct. 9, 2020, in CN 201810394688.4, 17 pgs.

* cited by examiner

DISTANCE MEASUREMENT METHOD, INTELLIGENT CONTROL METHOD, ELECTRONIC DEVICE, AND STORAGE MEDIUM

CROSS-REFERENCE TO RELATED APPLICATIONS

The present application is a continuation of and claims priority under 35 U.S.C. § 120 to International Application No. PCT/CN2019/084519, filed Apr. 26, 2019, which claims priority to Chinese Patent Application No. 201810394688.4, filed in the Chinese Patent Office on Apr. 27, 2018 and entitled "DISTANCE MEASUREMENT METHOD, INTELLIGENT CONTROL METHOD, AND APPARATUS, ELECTRONIC DEVICE, AND STORAGE MEDIUM". All above-referenced priority documents are incorporated herein by reference in their entirety.

TECHNICAL FIELD

The present disclosure relates to the field of computer vision technologies, and in particular, to a distance measurement method, an intelligent control method and apparatus, an electronic device, and a storage medium.

BACKGROUND

When a vehicle is intelligently driven, it is necessary to use a computer vision technology to sense distances to other vehicles and passersby, and to use the sensed distances to other vehicles and passersby in decision concerning intelligent driving.

SUMMARY

The present disclosure provides a technical solution concerning a distance measurement method and a technical solution concerning an intelligent control method.

According to one aspect of the present disclosure, a distance measurement method is provided, including: obtaining a detection bounding box of a target object in an image photographed by a current object; determining at least one distance measurement point according to the shape of the detection bounding box; and determining a distance between the target object and the current object based on the distance measurement point.

According to one aspect of the present disclosure, an intelligent control method is provided, including: obtaining a distance between a current object and a target object by using the distance measurement method as stated above; and generating early warning information and/or control information for the current object according to the distance.

According to one aspect of the present disclosure, a distance measurement apparatus is provided, including: a detection bounding box obtaining module, configured to obtain a detection bounding box of a target object in an image photographed by a current object; a distance measurement point determining module, configured to determine at least one distance measurement point according to the shape of the detection bounding box; and a distance determining module, configured to determine a distance between the target object and the current object based on the distance measurement point.

According to one aspect of the present disclosure, an intelligent control apparatus is provided, including: a distance obtaining module, configured to obtain a distance between a current object and a target object by using the distance measurement apparatus as stated above; and a control information generating module, configured to generate early warning information and/or control information for the current object according to the distance.

According to one aspect of the present disclosure, an electronic device is provided, including: a processor; and a memory configured to store processor executable instructions, where the processor is configured to: execute the distance measurement method and/or the intelligent control method.

According to one aspect of the present disclosure, a computer readable storage medium is provided, having computer program instructions stored thereon, where when the computer program instructions are executed by a processor, the distance measurement method and/or the intelligent control method provided in the present disclosure is implemented.

According to one aspect of the present disclosure, a computer program is provided, where when the computer program is executed by a processor, the distance measurement method and/or the intelligent control method provided in the present disclosure is implemented.

In embodiments of the present disclosure, at least one distance measurement point is determined according to the shape of a detection bounding box of a target object, and then a distance between a current object and the target object is determined according to the distance measurement point. Since the shape of the detection bounding box is closely related to the distance of the target object, a photographing visual angle, and a motion state of the target object per se, the distance measurement point determined according to the shape of the detection bounding box can be applied to obtain an accurate measurement result.

The other features and aspects of the present disclosure can be described more clearly according to the detailed descriptions of the exemplary embodiments in the accompanying drawings below.

BRIEF DESCRIPTION OF THE DRAWINGS

The accompanying drawings included in the specification and constituting a part of the specification illustrate the exemplary embodiments, features, and aspects of the present disclosure together with the specification, and are used for explaining the principles of the present disclosure.

DETAILED DESCRIPTION

Figure 1:
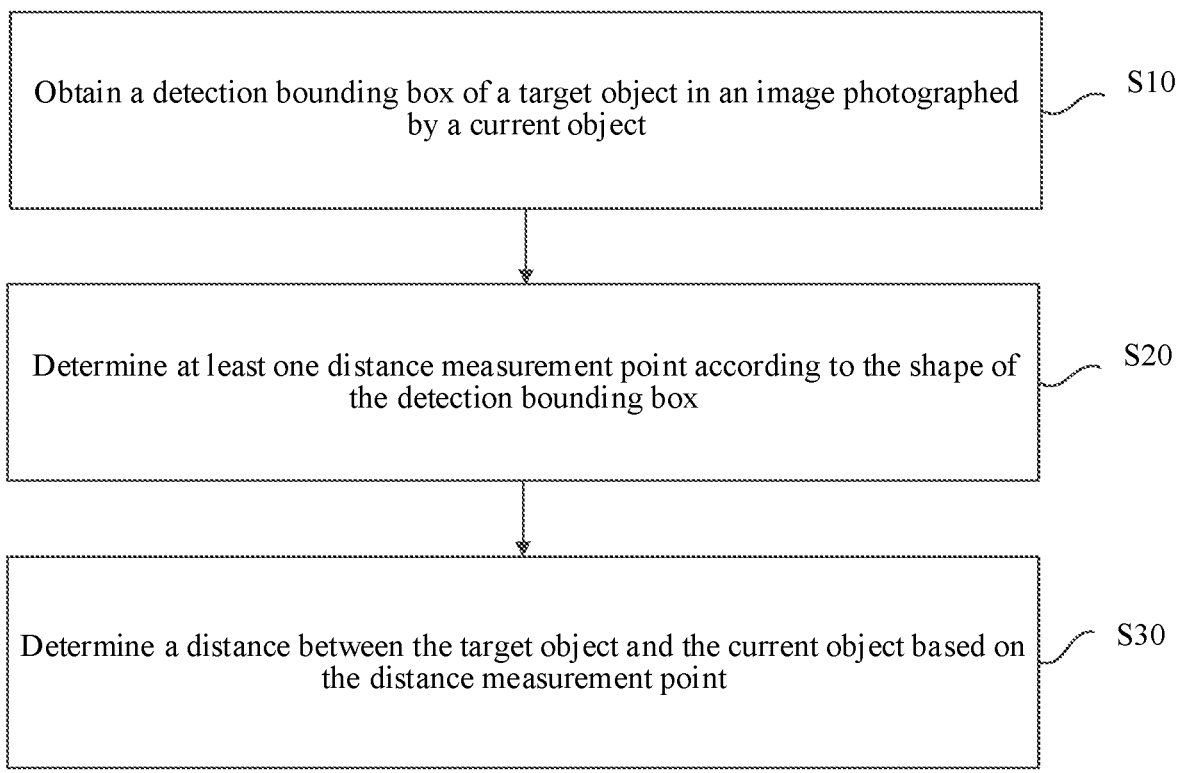
FIG. 1 is a flowchart of a distance measurement method according to one embodiment of the present disclosure.

Various exemplary embodiments, features, and aspects of the present disclosure are described below in detail with reference to the accompanying drawings. The same reference numerals in the accompanying drawings represent elements having the same or similar functions. Although the various aspects of the embodiments are illustrated in the accompanying drawings, unless stated particularly, it is not required to draw the accompanying drawings in proportion.

The special word "exemplary" here means "used as examples, embodiments, or descriptions". Any "exemplary" embodiment given here is not necessarily construed as being superior to or better than other embodiments.

In addition, numerous details are given in the following detailed description for the purpose of better explaining the present disclosure. It should be understood by persons skilled in the art that the present disclosure can still be implemented even without some of those details. In some examples, methods, means, elements, and circuits that are well known to persons skilled in the art are not described in detail so that the principle of the present disclosure becomes apparent.

FIG. 1 is a flowchart of a distance measurement method according to one embodiment of the present disclosure. As shown in FIG. 1, the distance measurement method includes the following steps.

At step S10, a detection bounding box of a target object in an image photographed by a current object is obtained.

In one possible implementation, the current object may include a movable object, and may also include an immovable object. The current object may include a person, a motor vehicle, a non-motor vehicle, a robot, a wearable device and the like. When the current object is a vehicle, embodiments of the present disclosure may be applied to the technical fields such as automatic driving and assistant driving. When the current object is a monitoring device provided at the roadside, the embodiments of the present disclosure may be applied to measure the distance between the target object and the monitoring device. The current object can be determined according to requirements. No limitation is made thereto in the present disclosure.

A photographing apparatus may be equipped on the current object to photograph an image in a set direction according to the requirements for distance measurement. The image photographed by the current object may include a single frame image photographed by using the photographing apparatus, and may also include frame images in a video stream photographed by using the photographing apparatus.

The current object may use various visual sensors, such as a monocular camera, an RGB camera, an infrared camera, and a binocular camera, for photographing images. Using a monocular camera system results in low costs and a swift response. The RGB camera or the infrared camera may be used for photographing images in a special environment. The binocular camera may be used for obtaining richer information of the target object. Different photographing devices may be selected and used according to the requirements for distance measurement, the environment, the type of the current object, the cost, and the like. No limitation is made thereto in the present disclosure.

The target object includes a vehicle, a passerby, a building, an obstacle, an animal, and the like. The target object may be a single or multiple target objects in one object type, and may also be multiple target objects in multiple object types. For example, only a vehicle is used as the target object, the target object may be one vehicle, and may be multiple vehicles. Vehicles and passersby may also be jointly used as the target objects. The target objects are multiple vehicles and multiple passersby. According to requirements, a set object type may be used as the target object, and a set individual object may also be used as the target object.

The detection bounding box of the target object in the image photographed by the current object can be obtained by using the image detection technology. The detection bounding box may be a rectangular bounding box, and may also be a bounding box in another shape. The shape of the detection bounding box of each target object in the image may be identical, and may also be different as the shape of the target object is different. The size of the detection bounding box may be different as an image area occupied by the target object in the image is different. For example, the target objects in the image include three motor vehicles and two passersby. By using the image detection technology, five detection bounding boxes can be used in the image to identify the target objects.

The detection bounding box may be an outline bounding box of the detected target object, for example, the detection bounding box is the smallest outline bounding box of the detected target object, the detection bounding box of each of the three motor vehicles may be the rectangular bounding box having a long span in the width direction, and the detection bounding box of either of the two passersby may be the rectangular bounding box having a long span in the height direction. The detection bounding box of the closer motor vehicle or passerby may be larger, and the detection bounding box of the farther motor vehicle or passerby may be smaller.

At step S20, at least one distance measurement point is determined according to the shape of the detection bounding box.

In one possible implementation, the distance measurement point is determined in the image, so as to be used for measuring the distance between the target object and the current object. The distance measurement point may be determined at a fixed position on the bottom edge of the detection bounding box, for example, a center point of the bottom edge of the detection bounding box is determined as the distance measurement point, and then the distance measurement point may be used for determining the distance between the target object and the current object.

In the image, the difference in distance of the target object, photographing visual angle, and motion state of the target object per se may result in a change in image content of the target object in the detection bounding box, and may also result in a change in the shape of the detection bounding box. For example, when the target object, a motor vehicle 1, parks or travels relative to the width direction of a vehicle 2 having an automatic driving or assistant driving function, one side of the motor vehicle 1 faces a camera, the detection bounding box of the motor vehicle 1 includes a vehicle body image of the side of the motor vehicle 1, and the shape of the detection bounding box is the rectangular bounding box having a long span in the width direction. When the motor vehicle 1 travels or parks relative to the height direction of the vehicle having the automatic driving or assistant driving function, the head or tail of the motor vehicle 1 faces a camera, the detection bounding box of the motor vehicle 1 includes an image of the head or tail of the motor vehicle 1, and the shape of the detection bounding box is the rectangular bounding box having a short span in the width direction.

In a conventional distance measurement method, the distance measurement point determined according to the center point of the bottom edge of the detection bounding box may be the center point of the bottom edge of the side of the motor vehicle 1, and may also be the center point of the bottom edge of the head or tail of the motor vehicle 1. The distance measurement point corresponds to a different position on the target object per se. The selected position of the distance measurement point may differ greatly as the distance of the target object, the photographing visual angle, and the motion state of the target object per se differ. Furthermore, an image obtained by the vehicle having the automatic driving or assistant driving function generally includes a moving target object, such as a motor vehicle traveling on the road and a passerby who is walking. Image content in the detection bounding box corresponding to the moving target object will change largely as the target object moves. Therefore, the distance measurement point determined according to the fixed position of the detection bounding box cannot reflect any constant attribute information of the target object per se, corresponds to different positions of the target object, and has a large change. Since the selection to the distance measurement point can influence the accuracy of a distance measurement result, the distance measurement point determined according to the fixed position of the detection bounding box cannot be applied to obtain an accurate measurement result.

The determining at least one distance measurement point according to the shape of the detection bounding box includes determining at least one distance measurement point on the detection bounding box or in the detection bounding box according to the shape of the detection bounding box. Since the shape of the detection bounding box is closely related to the distance of the target object, the photographing visual angle, and the motion state of the target object per se, the distance measurement point determined according to the shape of the detection bounding box can be applied to obtain the accurate measurement result.

At step S30, a distance between the target object and the current object is determined based on the distance measurement point.

In one possible implementation, in the field of computer vision technologies, plane homography may be defined as projection mapping from one plane to another plane. The plane homography may include mapping of a point on a two-dimensional plane to an image. After the corresponding position of the distance measurement point in the image is mapped to an environment where the current object is located by using a homography matrix constructed based on the environment where the current object is located, the distance between the target object and the current object is determined.

In one possible implementation, when the images photographed by the current object are multiple associated static images, or when the images photographed by the current object are frame images in a video stream, the distance measurement point is determined separately according to each image. Or, the position of the distance measurement point of the same target object determined in a first image is used as the positions of the distance measurement points in all the images, and no separate calculation is performed on the subsequent images any more.

In the embodiments, at least one distance measurement point is determined according to the shape of the detection bounding box of the target object, and then the distance between the current object and the target object is determined according to the distance measurement point. Since the shape of the detection bounding box is closely related to the distance of the target object, the photographing visual angle, and the motion state of the target object per se, the distance measurement point determined according to the shape of the detection bounding box can be applied to obtain the accurate measurement result.

In one possible implementation, prompt information may be sent according to the determined distance.

The prompt information may include sound information, image information, vibration information, a short massage, email information and the like. Prompt information of different levels may be sent according to the value of the determined distance. For example, if the distance is less than 5 m, serious warning information is sent, if the distance is greater than 5 m and less than 10 m, warning information is sent, and if the distance is greater than 10 m, notification information is sent. The prompt information of different levels may be represented in different information forms, for example, the serious warning information adopts the sound information, the warning information adopts the vibration information, and the notification information adopts the short message information. The prompt information of different levels may also be represented using sounds of different decibels, for example, 100 decibel sound indicates the serious warning information, 50 decibel sound indicates the warning information, and 20 decibel sound indicates the notification information. No limitation is made thereto in the present disclosure.

In one possible implementation, the detection bounding box includes the rectangular bounding box, and the determining at least one distance measurement point according to the shape of the detection bounding box includes: determining at least one distance measurement point according to the height of the rectangular bounding box.

In one possible implementation, a three-dimensional coordinate system is established by taking the ground plane as a determined plane of X axis and Y axis and the direction from the ground plane to the sky as a positive direction of Z axis. When the established three-dimensional coordinate system corresponds to the image photographed by the current object, the height of the rectangular bounding box of the target object is a distance in the Z axis direction calculated by taking the bottom edge of the rectangular bounding box as the origin of a Z axis coordinate and the top edge of the rectangular bounding box as an endpoint of the Z axis coordinate. The bottom edge of the rectangular bounding box is an edge where the part of the target object in contact with the ground is located. For example, if the target object is the vehicle, the bottom edge of the rectangular bounding box is the edge where tires are located. The height of the rectangular bounding box is the height from the tire of the vehicle to the roof.

The width direction of the rectangular bounding box is a projection direction of the rectangular bounding box on a plane parallel to the ground plane (which can also be referred as a horizontal direction). Optionally, the width of the rectangular bounding box may include width information of the target object in a direction in which the target object is photographed. The height direction of the rectangular bounding box is a projection direction of the rectangular bounding box on a plane perpendicular to the ground plane (which can also be referred as a vertical direction). Optionally, the height of the rectangular bounding box may include height information of the target object in the direction in which the target object is photographed. The width of the rectangular bounding box corresponding to the target object may change largely as the motion state and the photographing angle differ. However, the height of the rectangular bounding box corresponding to the target object does not change obviously even the motion state and the photographing angle differ because the height reflects height information of the target object per se. For example, for the rectangular bounding box corresponding to the target object, the motor vehicle 1, in the image, as the motor vehicle 1 turns, the width of the rectangular bounding box changes largely while the shape of the rectangular bounding box does not change largely.

In the embodiments, since the height information of the target object per se does not change largely in the image, a more accurate distance measurement result can be obtained according to the distance measurement point determined according to the height of the rectangular bounding box.

In one possible implementation, the determining at least one distance measurement point according to the height of the rectangular bounding box includes: determining at least one distance measurement point on the bottom edge of the rectangular bounding box according to the height of the rectangular bounding box.

In one possible implementation, the at least one distance measurement point may be determined on the bottom edge of the rectangular bounding box according to the height of the rectangular bounding box. The bottom edge of the rectangular bounding box is the edge where the part of the target object in contact with the ground is located, and the position of the bottom edge is relatively fixed and more stable.

In the case of determining the distance measurement point on the bottom edge of the rectangular bounding box, the left or right end point of the bottom edge of the rectangular bounding box may be taken as a start point, a product is obtained by multiplying the height of the rectangular bounding box with a height weight coefficient, and the position on the bottom edge of the rectangular bounding box having a distance to the start point as the value of the product is determined as the position of the distance measurement point. For example, the width of the rectangular bounding box of the motor vehicle 1 is 3 cm, the height is 1 cm, and the height weight coefficient is 0.5. The left end point of the bottom edge of the rectangular bounding box is taken as the start point, the position on the bottom edge of the rectangular bounding box having the distance to the left end point of the bottom edge as 1×0.5=0.5 (cm) is determined as the position of the distance measurement point.

In the embodiments, at least one distance measurement point is determined on the bottom edge of the rectangular bounding box according to the height of the rectangular bounding box, so that the more accurate distance measurement result is obtained.

In one possible implementation, determining the distance measurement point on the bottom edge of the rectangular bounding box according to the height of the rectangular bounding box includes:

determining the height weight coefficient according to an aspect ratio and an aspect ratio threshold of the rectangular bounding box; and determining the distance measurement point on the bottom edge of the rectangular bounding box according to the height of the rectangular bounding box and the height weight coefficient.

In one possible implementation, the height weight coefficient may include a first height weight coefficient and a second height weight coefficient, and the first height weight coefficient is different from the second height weight coefficient. The aspect ratio of the rectangular bounding box includes a ratio of the width to the height of the rectangular bounding box. Since the target object is different, the ratio of the width to the height of the rectangular bounding box is also different. In the case of determining the distance measurement point on the bottom edge of the rectangular bounding box according to the height of the rectangular bounding box, the position of the distance measurement point on the bottom edge of the rectangular bounding box may deviate greatly due to the overlarge height of the rectangular bounding box. The distance measurement point is determined after the first height weight coefficient or the second height weight coefficient is selected to be multiplied by the height of the rectangular bounding box according to the aspect ratio and the aspect ratio threshold of the rectangular bounding box, where the position of the distance measurement point can be determined more accurately and reasonably because the target object is different.

The aspect ratio threshold includes a threshold determined according to the ratio of the width to the height of the rectangular bounding box. It may be determined according to the aspect ratio and the aspect ratio threshold of the rectangular bounding box that the first height weight coefficient or the second height weight coefficient is multiplied by the height of the rectangular bounding box. For example, the aspect ratio threshold is 1, the first height weight coefficient is 0.1, and the second height weight coefficient is 0.5. A rectangular bounding box 1 is the vehicle, the width of the rectangular bounding box 1 is 3 cm, the height is 1 cm, and the aspect ratio of the rectangular bounding box 1 is 3. A rectangular bounding box 2 is the passerby, the width of the rectangular bounding box 2 is 1 cm, the height is 3 cm, and the aspect ratio of the rectangular bounding box 2 is 0.3. If the distance measurement point is determined according to the same height weight coefficient 0.5, and the left end point of the bottom edge of the rectangular bounding box is taken as the start point, the distance measurement point is determined at a position of the rectangular bounding box 1 away from the start point by 0.5 cm, and the distance measurement point is determined at a position of the rectangular bounding box 2 away from the start point by 1.5 cm, which is greater than the total length of the bottom edge of the rectangular bounding box 2, such that the position of the distance measurement point deviates greatly.

The aspect ratios of the rectangular bounding box 1 and the rectangular bounding box 2 may be compared with the aspect ratio threshold. The aspect ratio of the rectangular bounding box is 3, which is greater than the aspect ratio threshold 1, and the height of the rectangular bounding box 1 is multiplied by the second height weight coefficient 0.5. The left end point of the rectangular bounding box 1 may be taken as the start point, and the distance measurement point is determined at a position away from the left end point of the bottom edge of the rectangular bounding box 1 by 1×0.5=0.5 (cm). The aspect ratio of the rectangular bounding box 2 is 0.3, which is less than the aspect ratio threshold 1, and the height of the rectangular bounding box 2 is multiplied by the first height weight coefficient 0.1. The left end point of the rectangular bounding box 2 may be taken as the start point, and the position of the distance measurement point is determined at a position away from the left end point of the bottom edge of the rectangular bounding box 2 by 3×0.1=0.3 (cm).

In the embodiments, a different height weight coefficient is selected to be multiplied by the height of the rectangular bounding box according to the comparison result of the aspect ratio and the aspect ratio threshold of the rectangular bounding box, and then the distance measurement point is determined on the bottom edge of the rectangular bounding box. It can adapt to rectangular bounding boxes of various heights, so that the determined position of the distance measurement point is more reasonable and the measurement result is more accurate. Moreover, the embodiments have a wider application range.

Figure 2:
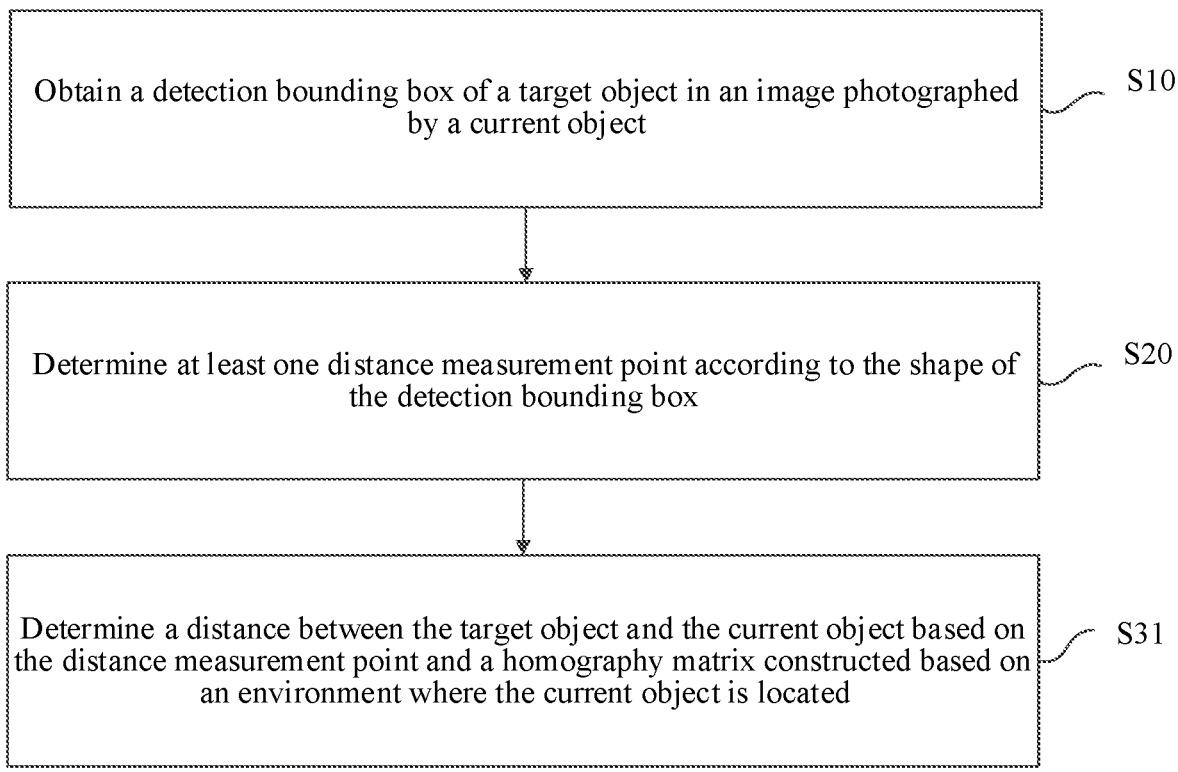
FIG. 2 is a flowchart of a distance measurement method according to one embodiment of the present disclosure.

FIG. 2 is a flowchart of a distance measurement method according to one embodiment of the present disclosure. As shown in FIG. 2, the step S30 includes the following steps.

At step S31, the distance between the target object and the current object is determined based on the distance measurement point and the homography matrix constructed based on the environment where the current object is located.

In one possible implementation, in computer vision, plane homography is defined as projection mapping from one plane to another plane. Switching may be achieved between two planes in a three-dimensional space. The mapping of a point on the two-dimensional plane to a camera imager is an example of plane homography. The mapping of point P on a calibration plate to point m on the imager by using homogeneous coordinates can be represented by using a so-called homography matrix, where the homogeneous coordinates include representing an original n-dimensional vector as an n+1 dimensional vector, and indicates a system of coordinates used in projective geometry, as Cartesian coordinates are used in Euclidean geometry.

Distance information from the distance measurement point in the image photographed by the current object to the target object can be obtained by using the homography matrix. The homography matrix may be constructed before distance measurement based on the environment where the current object is located. For example, a real road surface image may be photographed by using a monocular camera equipped on an automatically-driven vehicle, and a homography matrix is constructed by using a set of points on the road surface image and a corresponding set of points of the set of points on the image on a real road surface. A specific method may include: 1. coordinate system establishment: establishing a vehicle body coordinate system by taking the left front wheel of the automatically-driven vehicle as an origin, a rightward direction of the visual angle of a driver as a positive direction of X axis, and a frontward direction as a positive direction of Y axis; 2. point selection: selecting points in the vehicle body coordinate system to obtain a set of selected points, such as (0, 5), (0, 10), (0, 15), (1.85, 5), (1.85, 10), and (1.85, 15), the unit of each point being meter, where farther points may also be selected as needed; 3. marking: marking the selected point on the real road surface to obtain a set of real points; 4. calibration: obtaining a corresponding pixel position of the set of real points in the photographed image by using the calibration plate and a calibration program; and 5. generating the homography matrix according to the corresponding pixel position.

The homography matrix may be constructed according to different distance ranges as needed. For example, the homography matrix is constructed according to a 100 m distance range, or according to a 10 m range. The narrower the distance range, the higher the precision of the distance determined according to the homography matrix.

In the embodiments, the distance of the target object is determined by using the homography matrix and the distance measurement point. The accurate distance of the target object may be obtained by using the calibrated homography matrix.

Figure 3:
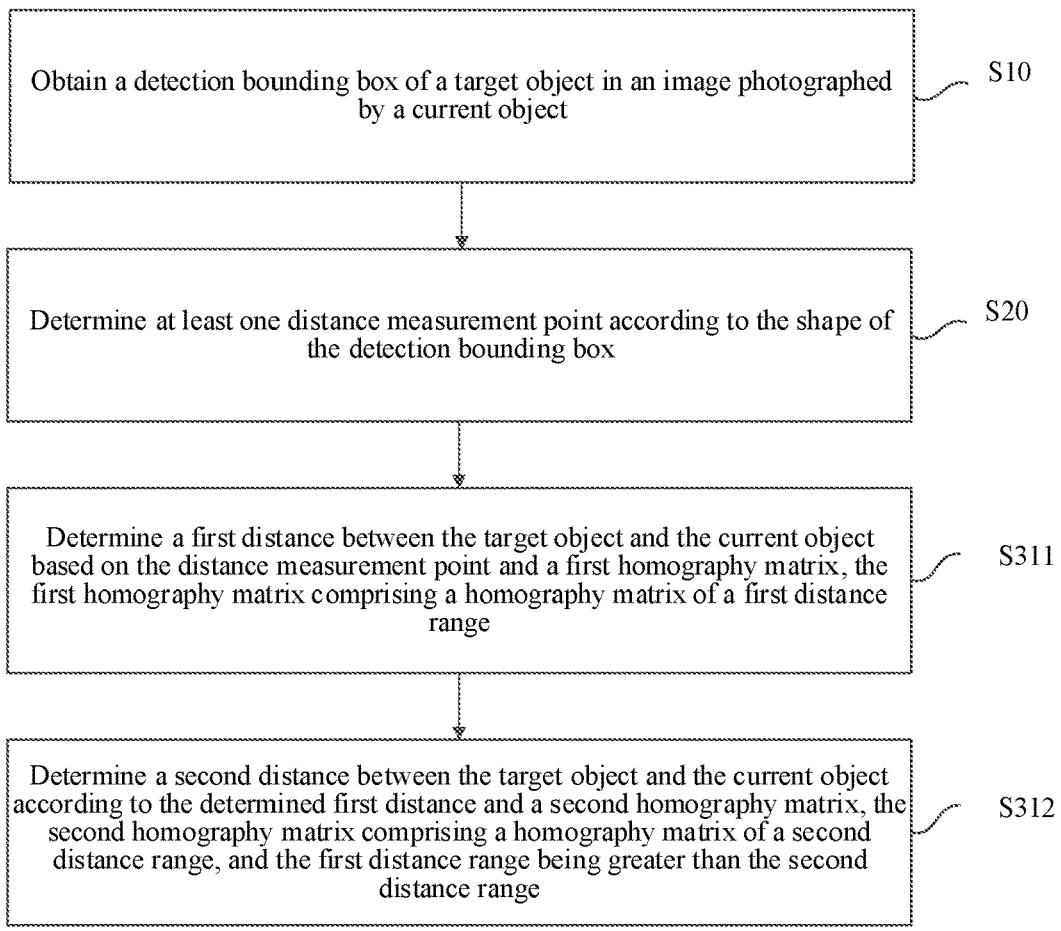
FIG. 3 is a flowchart of a distance measurement method according to one embodiment of the present disclosure.

FIG. 3 is a flowchart of a distance measurement method according to one embodiment of the present disclosure. As shown in FIG. 3, the step S31 includes the following steps.

At step S311, a first distance between the target object and the current object is determined based on the distance measurement point and a first homography matrix, the first homography matrix including a homography matrix of a first distance range.

At step S312, a second distance between the target object and the current object is determined according to the determined first distance and a second homography matrix, the second homography matrix including a homography matrix of a second distance range, and the first distance range being greater than the second distance range.

In one possible implementation, after the first distance of the target object is determined according to the first homography matrix and the distance measurement point, the second distance of the target object may then be determined by using the second homography matrix. Since the first distance range is greater than the second distance range, the second distance calculated by using the second homography matrix is more accurate. For example, the distance range of the first homography matrix is 100 m, and the distance range of the second homography matrix is 10 m, so that the second homography matrices of 10 distance ranges, i.e., 0-10 m, 10-20 m, 20-30 m . . . 90-100 m, may be generated. It is also applicable to only generate the second homography matrix of a set distance range as needed, for example, only four second homography matrices of 20-30 m, 30-40 m, 40-50 m, and 50-60 m are generated. For example, it is determined according to the first homography matrix and the distance measurement point that the distance of the target object is 58.32 m, and then it is further determined according to the second homography matrix of 50-60 m that the second distance of the target object is 54.21 m.

In the embodiments, the distance between the target object and the current object is determined according to the homography matrices of different distance ranges, so that the calculation efficiency is improved and the distance measurement result is more accurate.

Figure 4:
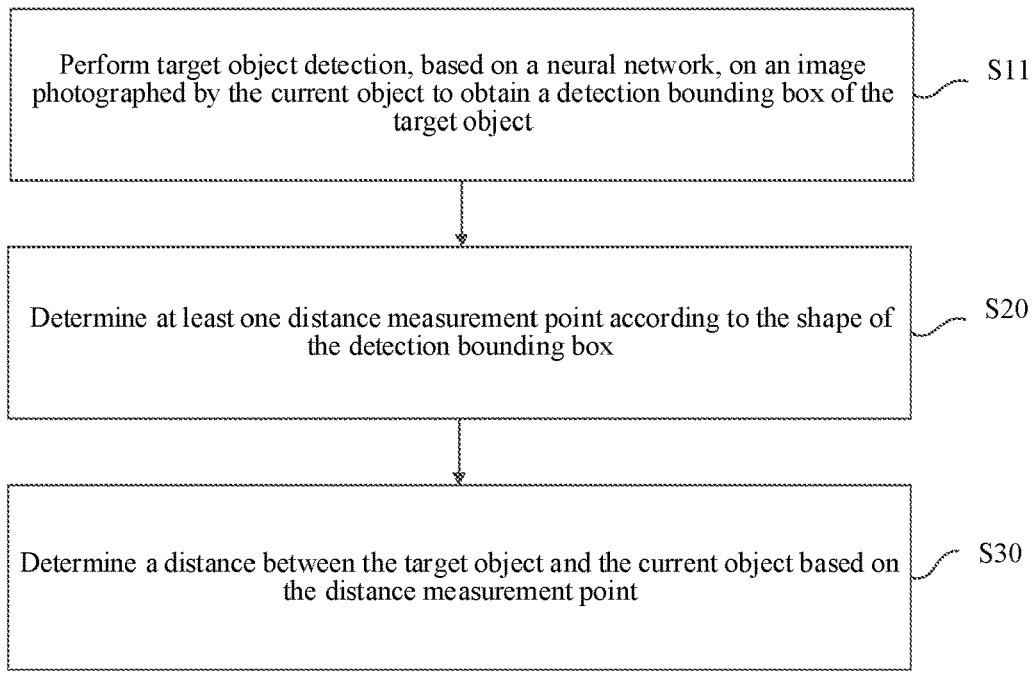
FIG. 4 is a flowchart of a distance measurement method according to one embodiment of the present disclosure.

FIG. 4 is a flowchart of a distance measurement method according to one embodiment of the present disclosure. As shown in FIG. 4, the step S10 includes the following step.

At step S11, target object detection is performed, based on a neural network, on the image photographed by the current object to obtain the detection bounding box of the target object.

In one possible implementation, the image may be detected based on the neural network to obtain the detection bounding box of the target object. The neural network may be based on architectural approaches such as Region-based Fully Convolutional Networks (RFCN), a Single Shot multibox Detector (SSD), Regions with Convolutional Neural Network (RCNN), FastRCNN (a Fast RCNN), FasterRCNN (a Faster RCNN), Spatial Pyramid Pooling Convolutional Networks (SPPNet), Deformable Parts Models (DPM), OverFeat, and You Only Look Once (YOLO). No limitation is made thereto in the present disclosure.

Figure 5:
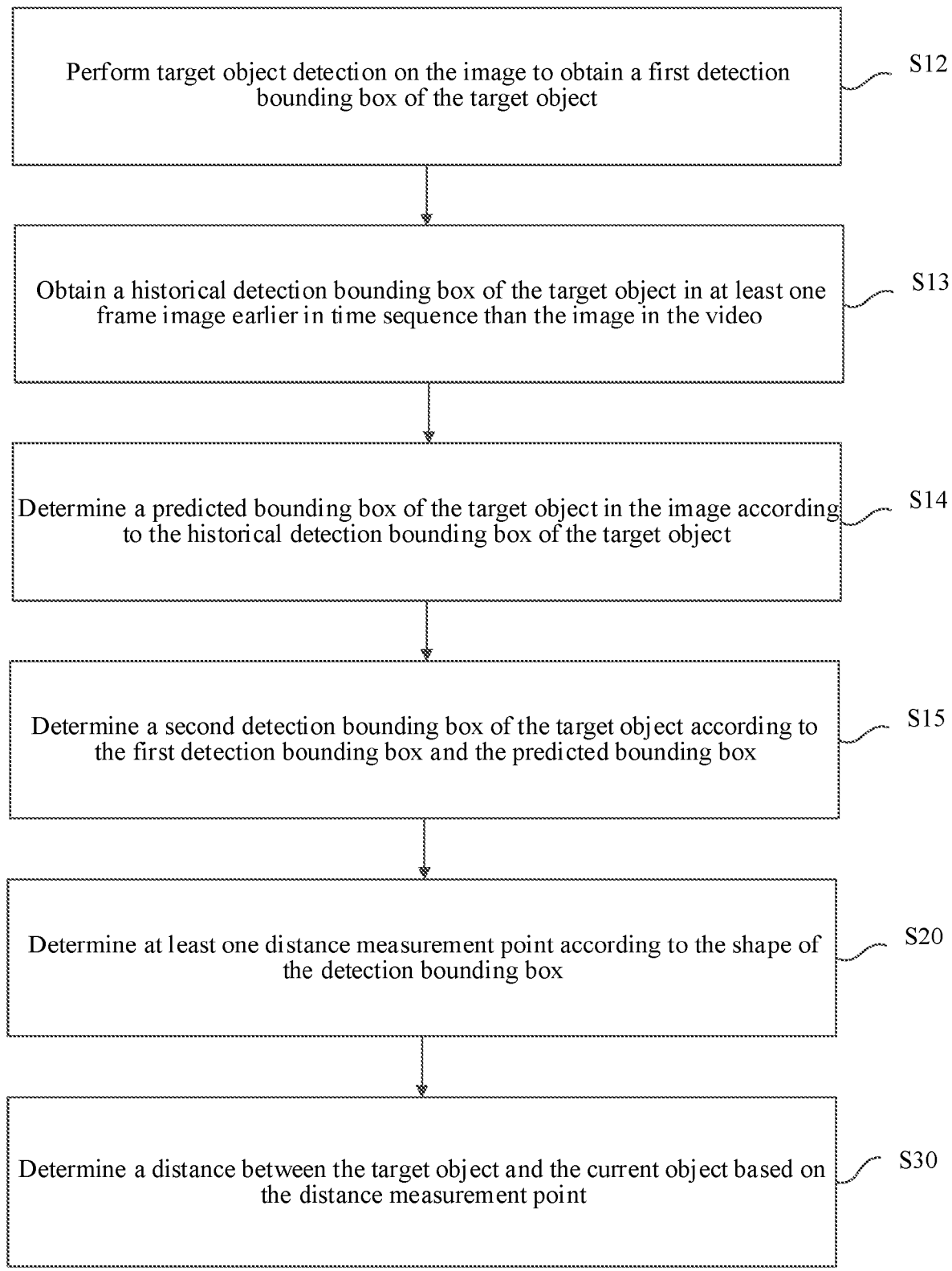
FIG. 5 is a flowchart of a distance measurement method according to one embodiment of the present disclosure.

FIG. 5 is a flowchart of a distance measurement method according to one embodiment of the present disclosure. The image is a frame image in a video photographed by the current object. As shown in FIG. 5, the step S10 includes the following steps.

At step S12, target object detection is performed on the image to obtain a first detection bounding box of the target object.

At step S13, a historical detection bounding box of the target object is obtained in at least one frame image earlier in time sequence than the image in the video.

At step S14, a predicted bounding box of the target object is determined in the image according to the historical detection bounding box of the target object.

At step S15, a second detection bounding box of the target object is determined according to the first detection bounding box and the predicted bounding box.

In one possible implementation, when the image is the frame image in the video photographed by the current object, the target object may also appear in at least one frame image earlier in time sequence than the image in the video. A detection bounding box in the frame image earlier than that of the target object may be taken as the historical detection bounding box of the target object. For example, a monitoring picture of the motor vehicle 1 is included in a monitoring video obtained by a monitoring camera facing a road. The detection bounding boxes of the motor vehicle 1 appear in the $10^{th}$ to $120^{th}$ frame of the monitoring video, and the detection bounding boxes of the motor vehicle 1 in the $10^{th}$ to $120^{th}$ frame of image are taken as the historical detection bounding boxes. A motion state of the motor vehicle 1 may be determined according to the historical detection bounding boxes of the motor vehicle 1. The positions of the motor vehicle 1 in the 121 frames of frame images may be predicted according to the determined motion state of the motor vehicle 1, and the positions of the predicted bounding boxes of the motor vehicle 1 in the 121 frame images may be predicted according to the predicted positions.

The historical detection bounding boxes may be screened so that a prediction result of the predicted bounding boxes is more accurate. For example, the historical detection bounding boxes having overlarge position change in the frame images earlier than the image may be excluded.

The predicted bounding box of the target object may be determined according to all the historical detection bounding boxes of the target object, and may also be determined according to a set number of historical detection bounding boxes of the target object. For example, the predicted bounding box is determined only according to 100 historical detection bounding boxes of the target object.

When a difference in the positions of the first detection bounding box and the predicted bounding box is less than a set threshold, the positions of the first detection bounding box and the predicted bounding box may be subjected to weighted averaging to obtain the position of the second detection bounding box, and the second detection bounding box is the detection bounding box of the target object in the obtained image photographed by the current object.

In the embodiments, the predicted bounding box of the target object is determined according to the historical detection bounding box of the target object, and the second detection bounding box of the target object is determined according to the predicted bounding box and the first detection bounding box, such that a confirmation process of the detection bounding box is more efficient and a confirmation result is more accurate.

In one possible implementation, the historical detection bounding box of the target object may be obtained in N frame images earlier than the image in the video photographed by the current object, where N being a positive integer greater than 1.

In one possible implementation, during the determination of the historical detection bounding box of the target object, since the motion state of the target object continuously changes, a previous historical detection bounding box will lose reference significance and may interfere with the prediction result of the predicted bounding box. The N frame images earlier than the image may be placed in a smooth queue in a manner of setting the smooth queue. For example, once determined, the detection bounding box of the current frame image may be taken as the historical detection bounding box of the target object in the next frame image. A current frame may be added into the smooth queue, and the earliest frame image in the smooth queue is deleted to keep only N frame images in the smooth queue. The value of N may be set as needed.

In the embodiments, the historical detection bounding box of the target object is obtained in the N frame images earlier than the image, so that the interference with the predicted bounding box by the earlier historical detection bounding box may be eliminated, and thus the prediction result of the predicted bounding box is more accurate.

Figure 6:
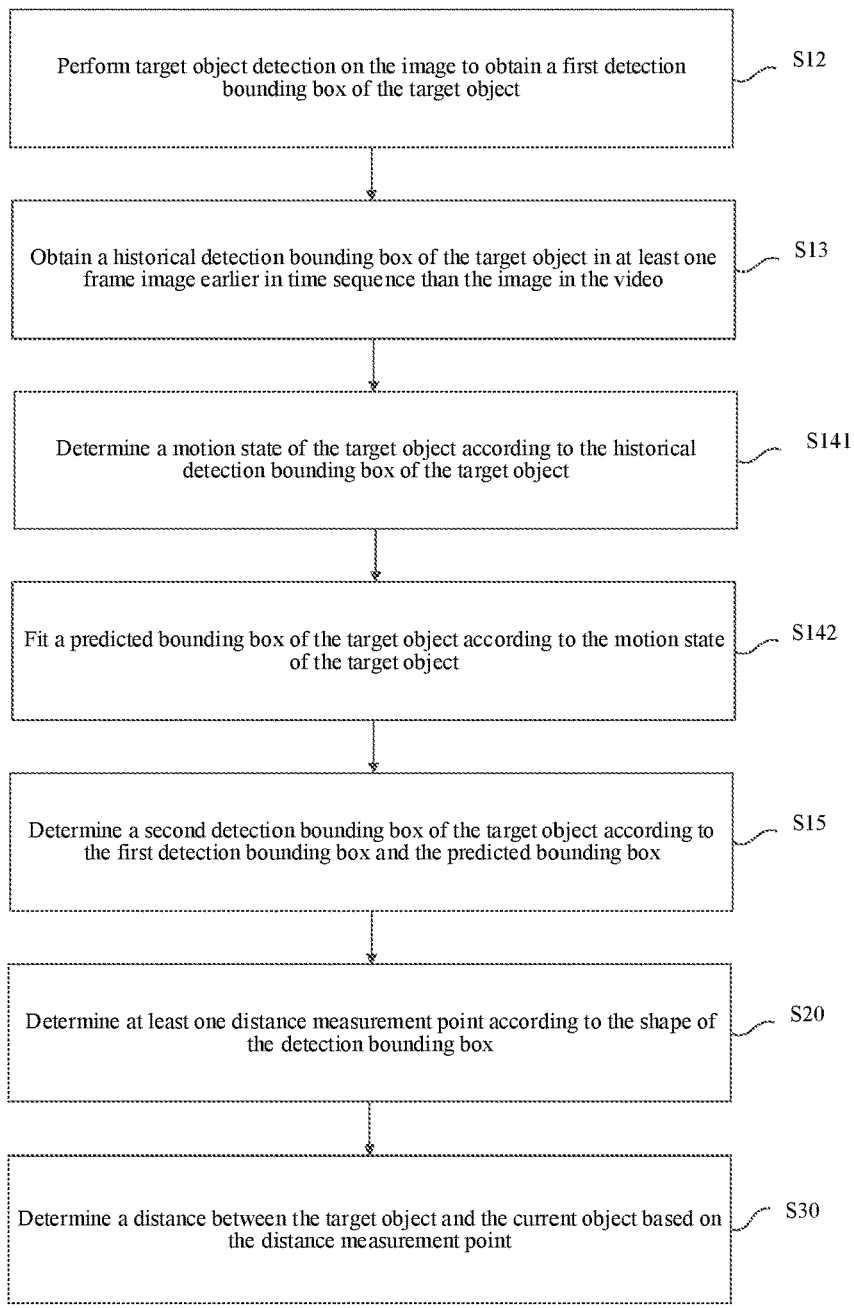
FIG. 6 is a flowchart of a distance measurement method according to one embodiment of the present disclosure.

FIG. 6 is a flowchart of a distance measurement method according to one embodiment of the present disclosure. The image is a frame image in a detection video. As shown in FIG. 6, the step S14 includes the following steps.

At step S141, the motion state of the target object is determined according to the historical detection bounding box of the target object.

At step S142, the predicted bounding box of the target object is fitted according to the motion state of the target object.

In one possible implementation, a history position, a motion speed, motion acceleration, a motion trajectory, and the like of the target object may be obtained according to the historical detection bounding boxes of the target object. The motion state of the target object in the image may be obtained according to the history position, the motion speed, the motion acceleration, and the motion trajectory of the target object. For example, it may be obtained according to the historical detection bounding boxes of the target object, the motor vehicle 2, that there are 100 positions of the historical detection bounding boxes of the motor vehicle 2, including coordinate point 1, coordinate point 2, coordinate point 3 . . . coordinate point 98, coordinate point 99, and coordinate point 100, and it may be obtained according to the foregoing coordinate points that the driving speed of the motor vehicle 2 is A km/h. A predicted coordinate point 101 of the motor vehicle 2 in the image may be obtained according to the 100 history coordinate points and the driving speed, and the predicted coordinate point 101 is determined as the position of the predicted bounding box of the motor vehicle 2.

In one possible implementation, the position of the predicted bounding box may be fitted according to the historical detection bounding boxes, and the aspect ratio of the last historical detection bounding box is taken as the aspect ratio of the predicted bounding box, thereby determining the predicted bounding box.

In the embodiments, after the motion state of the target object is determined according to the historical detection bounding boxes of the target object, the position of the predicted bounding box of the target object may be fitted according to the motion state of the target object, so that the predicted bounding box is more accurate.

In one possible implementation, the image is the frame image in the detection video. The step S14 includes:

determining a change state of an aspect ratio of the historical detection bounding box according to the historical detection bounding box of the target object; and fitting an aspect ratio of the predicted bounding box of the target object according to the change state of the aspect ratio of the historical detection bounding box.

In one possible implementation, the size and shape of the historical detection bounding box will change accordingly depending on the motion state of the target object. For example, for a motor vehicle 3 traveling close to a vehicle having the automatic driving or assistant driving function from an opposite direction, as the motor vehicle 3 gets closer to the vehicle having the automatic driving or assistant driving function, the detection bounding box of the motor vehicle 3 includes more and more images of the side vehicle body, and the width of the detection bounding box also continuously changes. The aspect ratio of the historical detection bounding box is closely associated with the motion state and position information of the target object. The aspect ratio of the predicted bounding box of the target object in the image may be fitted according to the change state of the aspect ratio of the target object in the historical detection bounding box.

In one possible implementation, the position of the predicted bounding box may be fitted according to the historical detection bounding box, the aspect ratio of the predicted bounding box is fitted according to the aspect ratio of the predicted bounding box, and finally, the predicted bounding box is determined according to the fitted position and the fitted aspect ratio.

In the embodiments, the aspect ratio of the predicted bounding box is fitted according to the change state of the aspect ratio of the historical detection bounding box of the target object, so that the predicted bounding box is more accurate.

In one possible implementation, the step S15 includes:

determining a first overlapping rate between the first detection bounding box of the target object and the predicted bounding box of the target object;

when the first overlapping rate is greater than or equal to a first overlapping threshold, determining a detection position of the target object according to the position of the first detection bounding box of the target object and the position of the predicted bounding box of the target object;

determining a detection aspect ratio of the target object according to an aspect ratio of the first detection bounding box of the target object and the aspect ratio of the predicted bounding box of the target object; and determining the second detection bounding box of the target object according to the detection position and the detection aspect ratio.

In one possible implementation, the first overlapping rate may include a repeat proportion of image content in the first detection bounding box and the predicted bounding box. When the first overlapping rate of the first detection bounding box and the predicted bounding box is greater than or equal to the first overlapping threshold, it can be considered that the first detection bounding box roughly coincides with the predicted bounding box, and the second detection bounding box may be obtained after the first detection bounding box is corrected according to the predicted bounding box. When the overlapping between the first detection bounding box and the predicted bounding box is less than the first overlapping rate, it can be considered that the first detection bounding box and the predicted bounding box have a large difference, and the section detection bounding box cannot be obtained after the first detection bounding box is corrected according to the predicted bounding box.

Correcting the first detection bounding box according to the predicted bounding box includes correcting the position of the first detection bounding box according to the position of the predicted bounding box, and correcting the aspect ratio of the first detection bounding box according to the aspect ratio of the predicted bounding box. The detection position of the target object may be determined by calculating an intermediate point of the position of the predicted bounding box and the position of the first detection bounding box, and the detection aspect ratio of the target object may be determined by calculating an intermediate value of the aspect ratio of the predicted bounding box and the aspect ratio of the first detection bounding box.

Or the detection position of the target object may be determined by performing weighted averaging on the positions of the predicted bounding box and the first detection bounding box, where the weight of the position of the first detection bounding box is higher than the weight of the position of the predicted bounding box, and the detection aspect ratio of the target object may be determined by performing weighted averaging on the aspect ratios of the predicted bounding box and the first detection bounding box, where the weight of the aspect ratio of the first detection bounding box is higher than the weight of the aspect ratio of the predicted bounding box.

The second detection bounding box of the target object may be determined according to the determined detection position and detection aspect ratio of the target object.

In the embodiments, the first overlapping rate between the predicted bounding box and the first detection bounding box of the target object is calculated, and after the first overlapping rate is compared with the first overlapping threshold, the detection position and the detection aspect ratio of the target object is determined according to both the predicted bounding box and the first detection bounding box which have the great overlapping rate. The detection position and the detection aspect ratio of the target object determined according to the predicted bounding box and the first detection bounding box better meet the motion trajectory of the target object. The obtained position and aspect ratio of the second detection bounding box are more accurate.

In one possible implementation, the method further includes:

when the first overlapping rate is less than the first overlapping threshold, determining the first detection bounding box of the target object as the second detection bounding box of the target object.

In one possible implementation, when the target object moves to fast, the first overlapping rate of the predicted bounding box and the first detection bounding box may be less than the first overlapping threshold. For example, when the target object, a motor vehicle 4, travels too fast, and thus images in the predicted bounding box and the first detection bounding box have a large difference, the value of predicting the predicted bounding box obtained according to the historical detection bounding box is lost. The first detection bounding box may be determined as the second detection bounding box.

In the embodiments, when the first overlapping rate between the predicted bounding box and the first detection bounding box is too small, the second detection bounding box of the target object is determined only according to the first detection bounding box. The influence from the content having no prediction value in the historical detection bounding box on the accuracy of the second detection bounding box may be reduced.

In one possible implementation, the determining the second detection bounding box of the target object according to the first detection bounding box and the predicted bounding box further includes: when target object detection is performed on the image, and the first detection bounding box of the target object cannot be obtained, the predicted bounding box of the target object is determined as the second detection bounding box of the target object.

In one possible implementation, when the first detection bounding box of the target object is not obtained, the predicted bounding box may be determined as the second detection bounding box of the target object. The detection bounding box is continuous and the measurement result is more complete.

In one possible implementation, the step S15 further includes: when the historical detection bounding box of the target object overlaps a historical detection bounding box of another object, obtaining a second overlapping rate between the historical detection bounding box of the target object and the historical detection bounding box of the another object; calculating a third overlapping rate between the historical detection bounding box of the target object and the first detection bounding box of the target object in a previous frame image of the image; and when the third overlapping rate is greater than the second overlapping rate, determining the first detection bounding box of the target object as the second detection bounding box of the target object.

In one possible implementation, when the target object is close to another object, images of the target object and the another object in the image may overlap. For example, for a motor vehicle 5 and a motor vehicle 6 parked side by side in a parking lot, images of the motor vehicle 5 and the motor vehicle 6 in a monitoring image may overlap in a particular photographing angle. When the target object is the motor vehicle 5, in the image, it is necessary to calculate the second overlapping rate between the historical detection bounding box of the motor vehicle 5 and the historical detection bounding box of the motor vehicle 6, and calculate a third overlapping rate between the first detection bounding box of the motor vehicle 5 and the historical detection bounding box of the motor vehicle 5, and when the third overlapping rate is greater than the second overlapping rate, the first detection bounding box of the motor vehicle 5 is determined as the second detection bounding box of the motor vehicle 5. It is possible to prevent the first detection bounding box of the motor vehicle 6 from being mistakenly determined as the detection bounding box of the motor vehicle 5.

In the embodiments, when the historical detection bounding box of the target object overlaps the historical detection bounding box of another object, the second detection bounding box of the target object is determined according to the second overlapping rate between the historical detection bounding box of the target object and the historical detection bounding box of the another object, and the third overlapping rate between the historical detection bounding box and the first detection bounding box of the target object. The interference with the target object by the another object close to the target object is reduced or even eliminated, thereby improving the accuracy of the detection bounding box of the target object.

In one possible implementation, the present disclosure provides an intelligent control method, including:

obtaining a distance between a current object and a target object by using the distance measurement method according to any one of embodiments of the present disclosure; and generating early warning information and/or control information for the current object according to the distance.

In one possible implement, the distance between the current object and the target object may be obtained according to the distance measurement method according to any one of the embodiments of the present disclosure, and depending on intelligent control requirements, the early warning information and/or the control information is generated according to the obtained distance.

In one possible implementation, the current object may include one or any combination of the following objects: a person, a vehicle, a robot, a wearable device, a blind guide device, a monitoring device, an intelligent terminal device, a production device, and a building. The intelligent control requirements may be determined according to the current object. For example, when the current object is a person, the early warning information may be sent to the person according to the obtained distance to the target object, so as to prompt that the person gets too close to the target object, and an avoidance measure needs to be taken. When the current object is a vehicle having an automatic driving or assistant driving function, the early warning information and/or the control information may be sent to the vehicle having the automatic driving or assistant driving function according to the obtained distance to the target object, so as to prompt a driver to take the avoidance measure or directly control the vehicle having the automatic driving or assistant driving function to make an avoidance action, etc. When the current object is the wearable device, the blind guide device, or the intelligent terminal device, the early warning information may be sent, according to the obtained distance to the target object, to a person who uses or wears the wearable device, the blind guide device, or the intelligent terminal device. When the current object is the monitoring device, the production device, or the building, the early warning information may be sent to a manager of the monitoring device, the production device, or the building according to the obtained distance to the target object.

When the target object is a combination of multiple objects, different early warning information and/or control information may be sent to the different objects according to the obtained distance to the target objects. No limitation is made thereto in the present disclosure.

In the embodiments, the early warning information and/or the control information for the current object is generated according to the obtained distance between the current object and the target object, so that the current object may take a corresponding measure according to the early warning information and/or the control information.

In one possible implementation, the generating the early warning information and/or the control information for the current object according to the distance includes:

generating the early warning information and/or the control information for the current object according to the distance and a distance threshold.

In one possible implementation, the distance threshold may be set, and after the obtained distance is compared with the distance threshold, the early warning information and/or the control information for the current object is generated according to the comparison result. The early warning information and/or the control information for the current object may be generated when the obtained distance is greater than the distance threshold. It is possible to reduce the number of times an intelligent control system sends early warning information with little warning significance and/or unnecessary intelligent control according to control information.

For example, the current object is vehicle A having the automatic driving or assistant driving function, distances to three target objects, including target object 1 having a distance of 100 m, target object 2 having a distance of 30 m, and target object 3 having a distance of 10 m, are obtained, and if the early warning information and/or the control information is generated according to the distances of the three target objects, the early warning information generated according to target object 1 has little early warning significance. The distance threshold may be set to be 20 m, and the early warning information and/or the control information is generated according to the distance of target object 3 having the distance less than 20 m, thereby improving the pertinence of the intelligent control system.

In one possible implementation, the generating the early warning information and/or the control information for the current object according to the distance and a distance threshold includes:

when the distance is less than or equal to the distance threshold, generating first early warning information and/or first control information for the current object; and when the distance is greater than the distance threshold, generating second early warning information and second control information for the current object.

In one possible implementation, the early warning level of the first early warning information is higher than that of the second early warning information, and the control level of the first control information is higher than that of the second control information. The early warning information and the control information of different levels may be determined according to the distance threshold. When the obtained distance is less than or equal to the distance threshold, the current object is close to the target object, and the first early warning information and/or the first control information at a high level may be sent. When the obtained distance is greater than the distance threshold, the current object is far away to the target object, and the second early warning information and/or the second control information at a low level may be sent.

In the embodiments, the early warning information and/or the control information of different levels may be determined according to the distance threshold, so that the early warning information and/or the control information generated for the current object is more accurate and more practical.

In one possible implementation, the generating the early warning information and/or the control information for the current object according to the distance includes:

determining an early warning level according to the distance; and determining early warning information according to the early warning level, and/or determining a control level according to the distance; and determining control information according to the control level.

In one possible implementation, multiple early warning levels may be determined according to different distances according to intelligent control requirements. The early warning levels may be determined according to the same distance interval. For example, five early warning levels, including a first early warning level for 0-5 m, a second early warning level for 5-10 m, a third early warning level for 10-15 m, a fourth early warning level for 15-20 m, and a fifth early warning level for 20-100 m, may be determined. The early warning levels may also be determined according to different distance intervals. For example, three early warning levels, including a first early warning level for 0-5 m, a second early warning level for 5-20 m, and a third early warning level for 20-200 m, may be determined. No limitation is made thereto in the present disclosure.

An approach of determining the control level may refer to the foregoing approach of determining the early warning level. The approach of determining the early warning level may be identical to or different from the approach of determining the control level. For example, the early warning level is determined when the distance is less than 150 m, and the control level is determined when the distance is less than 20 m. No limitation is made thereto in the present disclosure.

In one possible implementation, the early warning information may include one or any combination of the following information: sound early warning information, light early warning information, text early warning information, image early warning information, and vibration information; and the control information may include one or any combination of the following information: emergency brake information, stop information, acceleration information, and turn information.

In one possible implementation, the early warning information of different information types may be set for different early warning levels, and the different early warning levels are distinguished by using the information types. Or the early warning information of the same information type may be set for different early warning levels, and the different early warning levels are distinguished by using different features of the early warning information per se. For example, the sound early warning information may be set for a high early warning level, and the text information is set for a low early warning level. The early warning information of different levels may also be represented using sounds of different decibels. No limitation is made thereto in the present disclosure.

In one possible implementation, the control information of different control types may be set for different control levels. The different control levels are distinguished by using the control types. Or the control information of the same control type may be set for different control levels, and the different control levels are distinguished by using different features of the control information per se. For example, the acceleration information or deceleration information may be set for a low control level, and the emergency brake information or stop information is set for a high control level. Or the acceleration information of small acceleration may be set for the low control level, and the acceleration information of large acceleration is set for the high control level. No limitation is made thereto in the present disclosure.

In one possible implementation, the control information may be applied to driving control to a vehicle having the automatic driving or assistant driving function. The driving control may include a control action for changing the motion state and/or a motion direction of a current driving object, for example, may include: control actions that may change the motion direction and/or the motion state of the current driving object, including performing acceleration, brake deceleration, driving direction changing on the current driving object and the like. For example, in one actual application scenario, if the original motion direction of the current vehicle having the automatic driving or assistant driving function is to keep going straight in a current lane, if the current vehicle would collide with a suspected collision object ahead on the basis of a collision time, the driving direction of the current vehicle having the automatic driving or assistant driving function may be changed by means of the driving control, so that the current vehicle having the automatic driving or assistant driving function changes a lane to avoid collision. If the suspected collision object ahead accelerates to move away in the process, the driving direction of the current vehicle having the automatic driving or assistant driving function may be changed by means of the driving control, so that the current vehicle having the automatic driving or assistant driving function keeps the original motion direction and keeps going straight in the current lane.

In the embodiments, the early warning level and/or the control level is determined according to the distance, so that the intelligent control system can achieve more sophisticated intelligent control.

It can be understood that the foregoing various method embodiments mentioned in the present disclosure may be combined with each other to form a combined embodiment without departing from the principle logic. Details are not described in the present disclosure again due to space limitation.

In addition, the present disclosure further provides an image processing apparatus, an electronic device, a computer readable storage medium, and a program, which can all be configured to implement any one of the methods provided in the present disclosure. For the corresponding technical solutions and descriptions, please refer to the corresponding contents in the method parts. Details are not described herein again.

Figure 7:
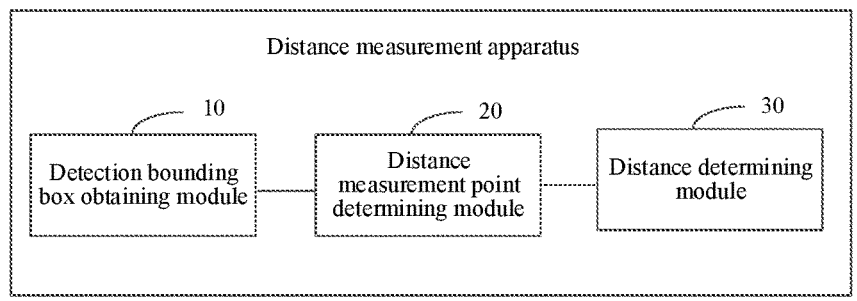
FIG. 7 is a block diagram of a distance measurement apparatus according to one embodiment of the present disclosure.

FIG. 7 is a block diagram of a distance measurement apparatus according to one embodiment of the present disclosure. As shown in FIG. 7, the distance measurement apparatus includes:

a detection bounding box obtaining module 10, configured to obtain a detection bounding box of a target object in an image photographed by a current object;

a distance measurement point determining module 20, configured to determine at least one distance measurement point according to the shape of the detection bounding box; and a distance determining module 30, configured to determine a distance between the target object and the current object based on the distance measurement point.

In the embodiments, at least one distance measurement point is determined according to the shape of the detection bounding box of the target object, and then the distance between the current object and the target object is determined according to the distance measurement point. Since the shape of the detection bounding box is closely related to the distance of the target object, the photographing visual angle, and the motion state of the target object per se, the distance measurement point determined according to the shape of the detection bounding box can be applied to obtain an accurate measurement result.

In one possible implementation, the detection bounding box includes a rectangular bounding box, and the distance measurement point determining module 20 includes: a first distance measurement point determining sub-module, configured to determine the at least one distance measurement point according to the height of the rectangular bounding box.

In the embodiments, since the height information of the target object per se does not change largely in the image, a more accurate distance measurement result can be obtained according to the distance measurement point determined according to the height of the rectangular bounding box.

In one possible implementation, the first distance measurement point determining sub-module includes: a bottom edge distance measurement point determining sub-module, configured to determine the at least one distance measurement point on the bottom edge of the rectangular bounding box according to the height of the rectangular bounding box.

In the embodiments, at least one distance measurement point may be determined on the bottom edge of the rectangular bounding box according to the height of the rectangular bounding box, so that the more accurate distance measurement result is obtained.

In one possible implementation, the bottom edge distance measurement point determining sub-module includes: a height weight coefficient determining sub-module, configured to determine a height weight coefficient according to an aspect ratio and an aspect ratio threshold of the rectangular bounding box; and a first bottom edge distance measurement point determining sub-module, configured to determine the distance measurement point on the bottom edge of the rectangular bounding box according to the height of the rectangular bounding box and the height weight coefficient.

In the embodiments, a different height weight coefficient is selected to be multiplied by the height of the rectangular bounding box according to a comparison result of the aspect ratio and the aspect ratio threshold of the rectangular bounding box, and then the distance measurement point is determined on the bottom edge of the rectangular bounding box. It can adapt to rectangular bounding boxes of various heights, so that the determined position of the distance measurement point is more reasonable and the measurement result is more accurate. Moreover, the embodiments have a wider application range.

In one possible implementation, the distance determining module includes: a first distance determining sub-module, configured to determine the distance between the target object and the current object based on the distance measurement point and a homography matrix constructed based on an environment where the current object is located.

In the embodiments, the distance of the target object is determined by using the homography matrix and the distance measurement point. The accurate distance of the target object may be obtained by using a calibrated homography matrix.

In one possible implementation, the first distance determining sub-module includes: a second distance determining sub-module, configured to determine a first distance between the target object and the current object based on the distance measurement point and a first homography matrix, the first homography matrix including a homography matrix of a first distance range; and a third distance determining sub-module, configured to determine a second distance between the target object and the current object according to the determined first distance and a second homography matrix, the second homography matrix including a homography matrix of a second distance range, and the first distance range being greater than the second distance range.

In the embodiments, the distance between the target object and the current object is determined according to the homography matrices of different distance ranges, so that the calculation efficiency is improved and the distance measurement result is more accurate.

In one possible implementation, the detection bounding box obtaining module includes: a first detection bounding box obtaining sub-module, configured to perform target object detection, based on a neural network, on the image photographed by the current object to obtain the detection bounding box of the target object. In the embodiments, the image may be detected based on the neural network to obtain the detection bounding box of the target object.

In one possible implementation, the image is a frame image in a video photographed by the current object. The detection bounding box obtaining module includes: a second detection bounding box obtaining sub-module, configured to perform target object detection on the image to obtain a first detection bounding box of the target object; a historical detection bounding box obtaining sub-module, configured to obtain a historical detection bounding box of the target object in at least one frame image earlier in time sequence than the image in the video; a predicted bounding box obtaining sub-module, configured to determine a predicted bounding box of the target object in the image according to the historical detection bounding box of the target object; and a third detection bounding box obtaining sub-module, configured to determine a second detection bounding box of the target object according to the first detection bounding box and the predicted bounding box.

In the embodiments, the predicted bounding box of the target object is determined according to the historical detection bounding box of the target object, and the second detection bounding box of the target object is determined according to the predicted bounding box and the first detection bounding box, such that a confirmation process of the detection bounding box is more efficient and a confirmation result is more accurate.

In one possible implementation, the predicted bounding box obtaining sub-module includes: a motion state obtaining sub-module, configured to determine a motion state of the target object according to the historical detection bounding box of the target object; and a first predicted bounding box obtaining sub-module, configured to fit the predicted bounding box of the target object according to the motion state of the target object.

In the embodiments, after the motion state of the target object is determined according to the historical detection bounding box of the target object, the position of the predicted bounding box of the target object may be fitted according to the motion state of the target object, so that the predicted bounding box is more accurate.

In one possible implementation, the predicted bounding box obtaining sub-module includes: a change state obtaining sub-module, configured to determine a change state of an aspect ratio of the historical detection bounding box according to the historical detection bounding box of the target object; and a second predicted bounding box obtaining sub-module, configured to fit an aspect ratio of the predicted bounding box of the target object according to the change state of the aspect ratio of the historical detection bounding box.

In the embodiments, the aspect ratio of the predicted bounding box is fitted according to the change state of the aspect ratio of the historical detection bounding box of the target object, so that the predicted bounding box is more accurate.

In one possible implementation, the third detection bounding box obtaining sub-module includes: a first overlapping rate obtaining sub-module, configured to determine a first overlapping rate between the first detection bounding box of the target object and the predicted bounding box of the target object; a detection position obtaining sub-module, configured to, when the first overlapping rate is greater than or equal to a first overlapping threshold, determine a detection position of the target object according to the position of the first detection bounding box of the target object and the position of the predicted bounding box of the target object; a detection aspect ratio obtaining sub-module, configured to determine a detection aspect ratio of the target object according to an aspect ratio of the first detection bounding box of the target object and the aspect ratio of the predicted bounding box of the target object; and a fourth detection bounding box obtaining sub-module, configured to determine the second detection bounding box of the target object according to the detection position and the detection aspect ratio.

In the embodiments, the first overlapping rate between the predicted bounding box and the first detection bounding box of the target object is calculated, and after the first overlapping rate is compared with the first overlapping threshold, the detection position and the detection aspect ratio of the target object is determined according to both the predicted bounding box and the first detection bounding box which have the great overlapping rate. The detection position and the detection aspect ratio of the target object determined according to the predicted bounding box and the first detection bounding box better meet the motion trajectory of the target object. The obtained position and aspect ratio of the second detection bounding box are more accurate.

In one possible implementation, the apparatus further includes: a fifth detection bounding box obtaining sub-module, configured to, when the first overlapping rate is less than the first overlapping threshold, determine the first detection bounding box of the target object as the second detection bounding box of the target object.

In the embodiments, when the first overlapping rate between the predicted bounding box and the first detection bounding box is too small, the second detection bounding box of the target object is determined only according to the first detection bounding box. The influence from the content having no prediction value in the historical detection bounding box on the accuracy of the second detection bounding box may be reduced.

In one possible implementation, the third detection bounding box obtaining sub-module further includes: a sixth detection bounding box obtaining sub-module, configured to, when the first detection bounding box of the target object is not obtained by performing target object detection on the image, determine the predicted bounding box of the target object as the second detection bounding box of the target object.

In the embodiments, when the first detection bounding box of the target object is not obtained, the predicted bounding box may be determined as the second detection bounding box of the target object. The detection bounding box is continuous and the measurement result is more complete.

In one possible implementation, the third detection bounding box obtaining sub-module further includes: a second overlapping rate obtaining sub-module, configured to, when the historical detection bounding box of the target object overlaps a historical detection bounding box of another object, obtain a second overlapping rate between the historical detection bounding box of the target object and the historical detection bounding box of the another object; a third overlapping rate obtaining sub-module, configured to calculate a third overlapping rate between the historical detection bounding box of the target object and the first detection bounding box of the target object in a previous frame image of the image; and a seventh detection bounding box obtaining sub-module, configured to, when the third overlapping rate is greater than the second overlapping rate, determine the first detection bounding box of the target object as the second detection bounding box of the target object.

In the embodiments, when the historical detection bounding box of the target object overlaps the historical detection bounding box of another object, the second detection bounding box of the target object is determined according to the second overlapping rate between the historical detection bounding box of the target object and the historical detection bounding box of the another object, and the third overlapping rate between the historical detection bounding box and the first detection bounding box of the target object. The interference with the target object by the another object close to the target object is reduced or even eliminated, thereby improving the accuracy of the detection bounding box of the target object.

In some embodiments, the functions provided by or the modules included in the distance measurement apparatus provided by the embodiments of the present disclosure may be used to implement the method described in the foregoing distance measurement method embodiments. For specific implementations, reference may be made to the description in the foregoing distance measurement method embodiments. For the purpose of brevity, details are not described herein again.

Figure 8:
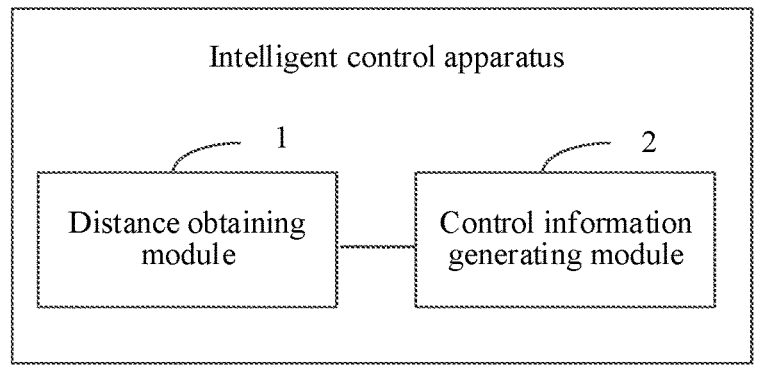
FIG. 8 is a block diagram of an intelligent control apparatus according to one embodiment of the present disclosure.

FIG. 8 is a block diagram of an intelligent control apparatus according to one embodiment of the present disclosure. As shown in FIG. 8, the intelligent control apparatus includes:

a distance obtaining module 1, configured to obtain a distance between a current object and a target object by using the apparatus according to any claim of the distance measurement method; and a control information generating module 2, configured to generate early warning information and/or control information for the current object according to the distance.

In the embodiments, the early warning information and/or the control information for the current object is generated according to the obtained distance between the current object and the target object, so that the current object may take a corresponding measure according to the early warning information and/or the control information.

In one possible implementation, the current object includes one or any combination of the following objects: a person, a vehicle, a robot, a wearable device, a blind guide device, a monitoring device, an intelligent terminal device, a production device, and a building.

In one possible implementation, the control information generating module 2 includes: a first control information generating module, configured to generate the early warning information and/or the control information for the current object according to the distance and a distance threshold.

In the embodiments, the distance threshold may be set, and after the obtained distance is compared with the distance threshold, the early warning information and/or the control information for the current object is generated according to the comparison result. The early warning information and/or the control information for the current object may be generated when the obtained distance is greater than the distance threshold. It is possible to reduce the number of times an intelligent control system sends early warning information with little warning significance and/or unnecessary intelligent control according to control information.

In one possible implementation, the first control information generating module includes: a first control information generating sub-module, configured to, when the distance is less than or equal to the distance threshold, generate first early warning information and/or first control information for the current object; and a second control information generating sub-module, configured to, when the distance is greater than the distance threshold, generate second early warning information and/or second control information for the current object.

In the embodiments, the early warning information and/or the control information of different levels may be determined according to the distance threshold, so that the early warning information and/or the control information generated for the current object is more accurate and more practical.

In one possible implementation, the first control information generating module includes: an early warning level determining sub-module, configured to determine an early warning level according to the distance; an early warning information determining sub-module, configured to determine the early warning information according to the early warning level, and/or a control level determining sub-module, configured to determine a control level according to the distance; and a control information determining sub-module, configured to determine the control information according to the control level.

In the embodiments, the early warning level and/or the control level is determined according to the distance, so that the intelligent control system can achieve more sophisticated intelligent control.

In one possible implementation, the early warning information includes one or any combination of the following information: sound early warning information, light early warning information, text early warning information, image early warning information, and vibration information; and the control information includes one or any combination of the following information: emergency brake information, stop information, acceleration information, deceleration information, and turn information.

In some embodiments, the functions provided by or the modules included in the intelligent control apparatus provided by the embodiments of the present disclosure may be used to implement the method described in the foregoing intelligent control method embodiments. For specific implementations, reference may be made to the description in the foregoing intelligent control method embodiments. For the purpose of brevity, details are not described herein again.

Figure 9:
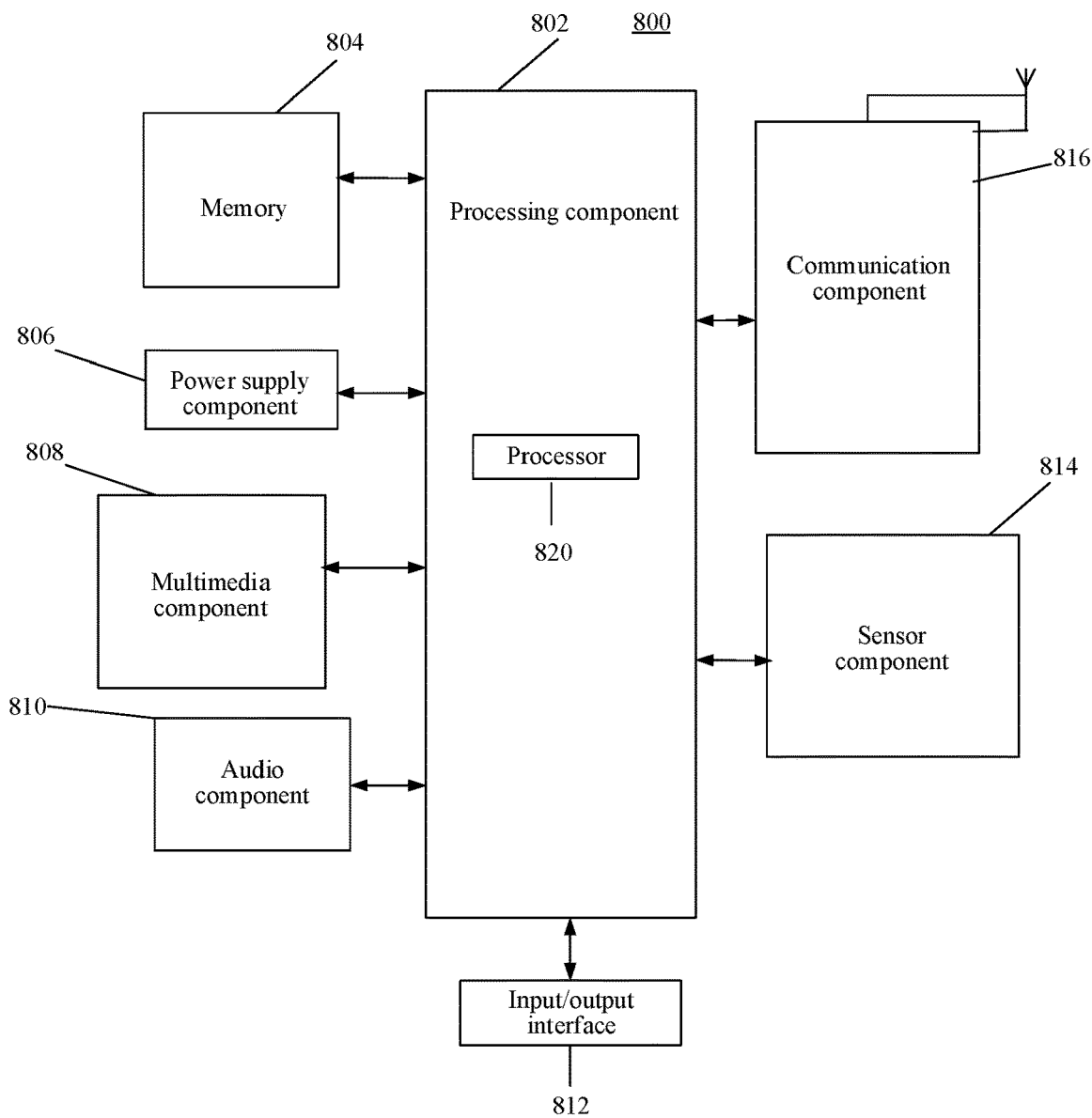
FIG. 9 is a block diagram of an electronic device according to one exemplary embodiment.

FIG. 9 is a block diagram of an electronic device according to one exemplary embodiment. The electronic device 800 may be provided as a terminal, a server, or devices in other forms. The electronic device is configured for distance measurement. For example, the device 800 may be a mobile phone, a computer, a digital broadcast terminal, a message transceiving device, a game console, a tablet device, a medical device, exercise equipment, a personal digital assistant, etc.

With reference to FIG. 9, the device 800 may include one or more of the following components: a processing component 802, a memory 804, a power supply component 806, a multimedia component 808, an audio component 810, an Input/Output (I/O) interface 812, a sensor component 814, and a communication component 816.

The processing component 802 generally controls overall operation of the device 800, such as operations associated with display, phone calls, data communications, camera operations, and recording operations. The processing component 802 may include one or more processors 820 to execute instructions to implement all or some of the steps of the methods above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the device 800. Examples of the data include instructions for any application or method operated on the device 800, contact data, contact list data, messages, pictures, videos, and the like. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power supply component 806 provides power for various components of the device 800. The power supply component 806 may include a power management system, one or more power supplies, and other components associated with power generation, management, and distribution for the device 800.

The multimedia component 808 includes a screen between the device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the device 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor assembly 814 includes one or more sensors for providing state assessment in various aspects for the device 800. For example, the sensor component 814 may detect an on/off state of the device 800, and relative positioning of components, which are for example the display and keypad of the device 800, and the sensor assembly 814 may further detect a position change of the device 800 or a component of the device 800, the presence or absence of contact of the user with the device 800, the orientation or acceleration/deceleration of the device 800, and a temperature change of the device 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the device 800 and other devices. The device 800 may access a wireless network based on a communication standard, such as WiFi, 2G, or 3G, or a combination thereof. In one exemplary embodiment, the communication component 816 receives a broadcast signal or broadcast-related information from an external broadcast management system by means of a broadcast channel. In one exemplary embodiment, the communication component 816 further includes a Near Field Communication (NFC) module to facilitate short-range communication. For example, the NFC module may be implemented based on Radio Frequency Identification (RFID) technology, Infrared Data Association (IrDA) technology, Ultra-Wideband (UWB) technology, Bluetooth (BT) technology, and other technologies.

In exemplary embodiments, the device 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the method above.

In exemplary embodiments, a non-volatile computer readable storage medium is further provided, for example, a memory 804 including computer program instructions, which may be executed by the processor 820 of the device 800 to implement the method above.

In exemplary embodiments, a computer program is further provided. When the computer program is executed by a processor, any method above is implemented. For example, the computer program may be executed by the processor 820 of the device 800 to implement any method above.

The present disclosure may be a system, a method, and/or a computer program product. The computer program product may include a computer readable storage medium having computer readable program instructions thereon for enabling a processor to implement aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination thereof. More specific examples (a non-exhaustive list) of the computer readable storage medium include: a portable computer diskette, a hard disk, a Random Access Memory (RAM), an ROM, an EPROM (or a flash memory), a SRAM, a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination thereof. A computer readable storage medium, as used herein, is not to be construed as being transitory signals per se, such as radio waves or other freely propagating electromagnetic waves, electromagnetic waves propagating by means of a waveguide or other transmission media (e.g., light pulses passing through a fiber-optic cable), or electrical signals transmitted by means of a wire.

Computer-readable program instructions described herein may be downloaded to respective computing/processing devices from the computer readable storage medium or to an external computer or external storage device by means of a network, for example, the Internet, a Local Area Network (LAN), a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. Computer readable program instructions may be executed completely on a user computer, executed partially on the user computer, executed as an independent software package, executed partially on the user computer and partially on a remote computer, or executed completely on the remote computer or server. In a scenario involving the remote computer, the remote computer may be connected to the user computer by means of any type of network, including a LAN or a Wide Area Network (WAN), or the connection may be made to an external computer (for example, connecting by using an Internet service provider by means of the Internet). In some embodiments, electronic circuitry including, for example, programmable logic circuitry, the FGPAs, or Programmable Logic Arrays (PLAs) may execute the computer readable program instructions by utilizing state information of the computer readable program instructions to personalize the electronic circuitry, so as to implement the aspects of the present disclosure.

The aspects of the present disclosure are described herein with reference to flowcharts and/or block diagrams of methods, apparatuses (systems), and computer program products according to the embodiments of the present disclosure. It should be understood that each block of the flowcharts and/or block diagrams, and combinations of the blocks in the flowcharts and/or block diagrams may be implemented by the computer readable program instructions.

These computer readable program instructions may be provided to a processor of a general-purpose computer, special-purpose computer, or other programmable data processing apparatus to produce a machine, such that the instructions, which execute by means of the processor of the computer or other programmable data processing apparatuses, create means for executing the functions/actions specified in one or more blocks of the flowcharts and/or block diagrams. These computer readable program instructions may also be stored in the computer readable storage medium, the instructions enable the computer, the programmable data processing apparatus, and/or other devices to function in a particular manner, so that the computer readable medium having instructions stored therein includes an article of manufacture including instructions which implement the aspects of the functions/actions specified in one or more blocks of the flowcharts and/or block diagrams.

The computer readable program instructions may also be loaded onto a computer, other programmable data processing apparatuses, or other devices to cause a series of operational steps to be performed on the computer, other programmable apparatuses or other devices to produce a computer implemented process, so that the instructions which execute on the computer, other programmable apparatuses or other devices implement the functions/actions specified in one or more blocks of the flowcharts and/or block diagrams.

The flowcharts and block diagrams in the accompanying drawings illustrate the architecture, functionality and operations of possible implementations of systems, methods, and computer program products according to multiple embodiments of the present disclosure. In this regard, each block in the flowchart or block diagram may represent a module, program segment, or portion of instruction, which includes one or more executable instructions for executing the specified logical function. In some alternative implementations, the functions noted in the block may also occur out of the order noted in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, may be implemented by special purpose hardware-based systems that perform the specified functions or actions or implemented by combinations of special purpose hardware and computer instructions.

The descriptions of the embodiments of the present disclosure have been presented for purposes of illustration, but are not intended to be exhaustive or limited to the embodiments disclosed. Many modifications and variations will be apparent to persons of ordinary skill in the art without departing from the scope and spirit of the described embodiments. The terminology used herein was chosen to best explain the principles of the embodiments, the practical application or technical improvement over technologies found in the marketplace, or to enable other persons of ordinary skill in the art to understand the embodiments disclosed herein.

What is claimed is:

1. A distance measurement method, comprising:
    obtaining a detection bounding box of a target object in an image photographed by a current object;
    determining at least one distance measurement point according to the shape of the detection bounding box; and
    determining a distance between the target object and the current object based on the distance measurement point,
    wherein the detection bounding box comprises a rectangular bounding box, and determining at least one distance measurement point according to the shape of the detection bounding box comprises:
    determining the at least one distance measurement point according to the height of the rectangular bounding box,
    wherein determining the at least one distance measurement point according to the height of the rectangular bounding box comprises:
    determining the at least one distance measurement point on the bottom edge of the rectangular bounding box according to the height of the rectangular bounding box.

2. The method according to claim 1, wherein determining the distance measurement point on the bottom edge of the rectangular bounding box according to the height of the rectangular bounding box comprises:
  determining a height weight coefficient according to an aspect ratio of the rectangular bounding box and an aspect ratio threshold; and
  determining the distance measurement point on the bottom edge of the rectangular bounding box according to the height of the rectangular bounding box and the height weight coefficient.

3. The method according to claim 1, wherein determining the distance between the target object and the current object based on the distance measurement point comprises:
  determining the distance between the target object and the current object based on the distance measurement point and a homography matrix constructed based on an environment where the current object is located.

4. The method according to claim 3, wherein determining the distance between the target object and the current object based on the distance measurement point and the homography matrix comprises:
  determining a first distance between the target object and the current object based on the distance measurement point and a first homography matrix, the first homography matrix comprising a homography matrix of a first distance range; and
  determining a second distance between the target object and the current object according to the determined first distance and a second homography matrix, the second homography matrix comprising a homography matrix of a second distance range, and the first distance range being greater than the second distance range.

5. The method according to claim 1, wherein obtaining the detection bounding box of the target object in the image photographed by the current object comprises:
  performing target object detection, based on a neural network, on the image photographed by the current object to obtain the detection bounding box of the target object.

6. The method according to claim 1, wherein the image is a frame image in a video photographed by the current object, and obtaining the detection bounding box of the target object in the image photographed by the current object comprises:
  performing target object detection on the image to obtain a first detection bounding box of the target object;
  obtaining a historical detection bounding box of the target object in at least one frame image earlier in time sequence than the image in the video;
  determining a predicted bounding box of the target object in the image according to the historical detection bounding box of the target object; and
  determining a second detection bounding box of the target object according to the first detection bounding box and the predicted bounding box.

7. The method according to claim 6, wherein determining the predicted bounding box of the target object in the image according to the historical detection bounding box of the target object comprises:
  determining a motion state of the target object according to the historical detection bounding box of the target object; and
  fitting the predicted bounding box of the target object according to the motion state of the target object; and/or
  determining a change state of an aspect ratio of the historical detection bounding box according to the historical detection bounding box of the target object; and
  fitting an aspect ratio of the predicted bounding box of the target object according to the change state of the aspect ratio of the historical detection bounding box.

8. The method according to claim 6, wherein determining the second detection bounding box of the target object according to the first detection bounding box and the predicted bounding box comprises:
  determining a first overlapping rate between the first detection bounding box of the target object and the predicted bounding box of the target object;
  when the first overlapping rate is greater than or equal to a first overlapping threshold, determining a detection position of the target object according to the position of the first detection bounding box of the target object and the position of the predicted bounding box of the target object;
  determining a detection aspect ratio of the target object according to an aspect ratio of the first detection bounding box of the target object and the aspect ratio of the predicted bounding box of the target object; and determining the second detection bounding box of the target object according to the detection position and the detection aspect ratio; or
  when the first detection bounding box of the target object is not obtained by performing target object detection on the image, determining the predicted bounding box of the target object as the second detection bounding box of the target object.

9. The method according to claim 8, wherein the method further comprises:
  when the first overlapping rate is less than the first overlapping threshold, determining the first detection bounding box of the target object as the second detection bounding box of the target object.

10. The method according to claim 6, wherein determining the second detection bounding box of the target object according to the first detection bounding box and the predicted bounding box comprises:
  when the historical detection bounding box of the target object overlaps a historical detection bounding box of another object, obtaining a second overlapping rate between the historical detection bounding box of the target object and the historical detection bounding box of the another object;
  calculating a third overlapping rate between the historical detection bounding box of the target object and the first detection bounding box of the target object in a previous frame image of the image; and
  when the third overlapping rate is greater than the second overlapping rate, determining the first detection bounding box of the target object as the second detection bounding box of the target object.

11. An intelligent control method, comprising:
  obtaining a distance between a current object and a target object by using the method according to claim 1; and
  generating early warning information and/or control information for the current object according to the distance.

12. The method according to claim 11, wherein the current object comprises one or any combination of the following objects: a person, a vehicle, a robot, a wearable device, a blind guide device, a monitoring device, an intelligent terminal device, a production device, and a building.

13. The method according to claim 11, wherein generating early warning information and/or control information for the current object according to the distance comprises:

generating the early warning information and/or the control information for the current object according to the distance and a distance threshold.

14. The method according to claim 13, wherein generating the early warning information and/or the control information for the current object according to the distance and the distance threshold comprises:
when the distance is less than or equal to the distance threshold, generating first early warning information and/or first control information for the current object; and when the distance is greater than the distance threshold, generating second early warning information and/or second control information for the current object.

15. The method according to claim 11, wherein generating early warning information and/or control information for the current object according to the distance comprises:
determining an early warning level according to the distance;
determining the early warning information according to the early warning level, and/or
determining a control level according to the distance; and determining the control information according to the control level.

16. The method according to claim 11, wherein the early warning information comprises one or any combination of the following information: sound early warning information, light early warning information, text early warning information, image early warning information, and vibration information; and
the control information comprises one or any combination of the following information: emergency brake information, stop information, acceleration information, deceleration information, and turn information.

17. An electronic device, comprising:
a processor; and
a memory configured to store processor executable instructions which, when executed by the processor, cause the processor to execute a distance measurement method, comprising:
obtaining a detection bounding box of a target object in an image photographed by a current object;
determining at least one distance measurement point according to the shape of the detection bounding box; and
determining a distance between the target object and the current object based on the distance measurement point,
wherein the detection bounding box comprises a rectangular bounding box, and determining at least one distance measurement point according to the shape of the detection bounding box comprises:
determining the at least one distance measurement point according to the height of the rectangular bounding box,
wherein determining the at least one distance measurement point according to the height of the rectangular bounding box comprises:
determining the at least one distance measurement point on the bottom edge of the rectangular bounding box according to the height of the rectangular bounding box.

18. A non-transitory computer readable storage medium, having computer program instructions stored thereon, wherein when the computer program instructions are executed by a processor, the processor is caused to implement a distance measurement method, comprising:
obtaining a detection bounding box of a target object in an image photographed by a current object;
determining at least one distance measurement point according to the shape of the detection bounding box; and
determining a distance between the target object and the current object based on the distance measurement point,
wherein the detection bounding box comprises a rectangular bounding box, and determining at least one distance measurement point according to the shape of the detection bounding box comprises:
determining the at least one distance measurement point according to the height of the rectangular bounding box,
wherein determining the at least one distance measurement point according to the height of the rectangular bounding box comprises:
determining the at least one distance measurement point on the bottom edge of the rectangular bounding box according to the height of the rectangular bounding box.

* * * * *